Aug. 7, 1923.
J. C. HOOPER
REEL SEAT
Filed Oct. 2, 1922
1,464,154
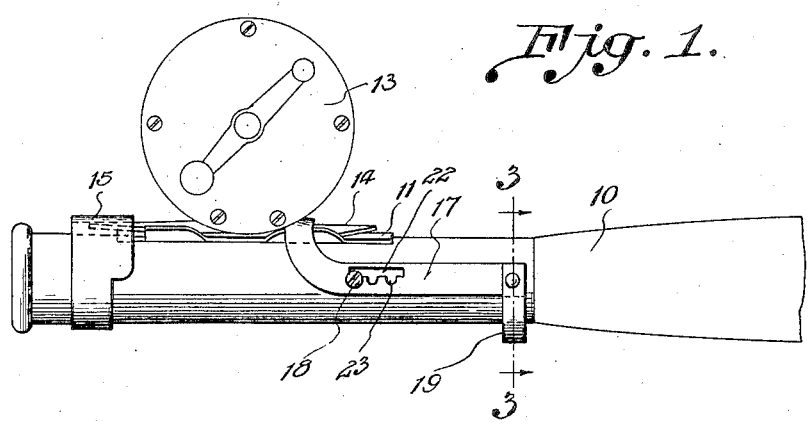
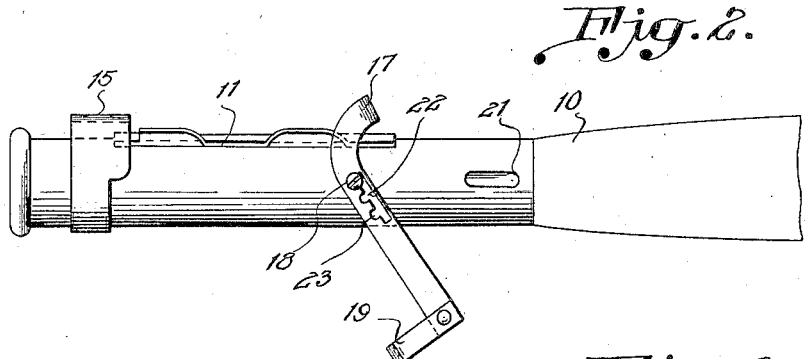
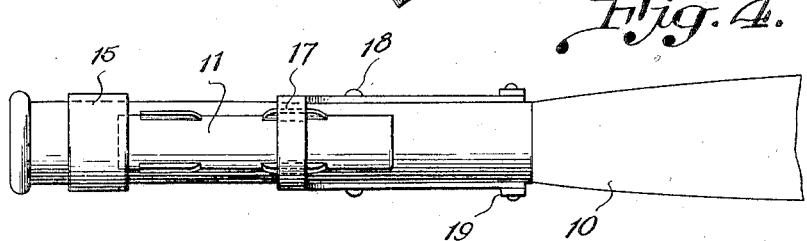
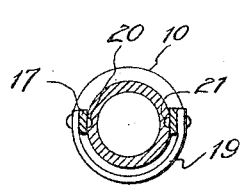
J. C. Hooper
INVENTOR
BY Victor J. Evans
ATTORNEY Patented Aug. 7, 1923.

1,464,154

UNITED STATES PATENT OFFICE.

JOSEPH C. HOOPER, OF WRIGHTSVILLE BEACH, NORTH CAROLINA.

REEL SEAT.

Application filed October 2, 1922. Serial No. 591,923.

*To all whom it may concern:*

Be it known that I, JOSEPH C. HOOPER, a citizen of the United States, residing at Wrightsville Beach, in the county of New Hanover and State of North Carolina, have invented new and useful Improvements in Reel Seats, of which the following is a specification.

This invention relates to fishing reels, and has particular application to means for holding the reel associated with its seat while in use, and to facilitate the removal of the reel as the occasion may require.

The nature and advantages of the invention will be better understood when the following detailed description is read in connection with the accompanying drawing, the invention residing in the construction, combination, and arangement of parts as claimed.

In the drawing forming part of this application, like numerals of reference indicate similar parts in the several views, and wherein:—

Figure 1 is a view in elevation showing the manner of holding the reel seated.

Figure 2 is a view, showing the inactive position of the clamping yoke, in which position the reel may be easily removed.

Figure 3 is a sectional view taken on line 3—3 of Figure 1.

Figure 4 is a top plan view.

Referring to the drawing in detail, 10 indicates a fishing pole with which the fishing reel seat 11 is associated, the fishing reel being indicated at 13 and including a base 14. The base 14 reposes upon the seat 11 in the usual wellknown manner, with one end of the base fitting beneath the ring 15, while the opposite end of the base is held effectively associated with the reel seat by means of a pivot yoke as shown. This yoke is indicated at 17 and pivoted as at 18, one end of the yoke being curved to extend across the seat 11 and to effectively hold the reel base engaged against its seat when the yoke is in the position shown in Figure 1. The free ends of the yoke are connected by a curved member 19 and carried by the said free ends of the yoke are projections 20 which snap into depressions 21 to hold the yoke fixed with relation to the pole 10 as will be readily understood. The construction and manner of mounting the yoke is such that it can be conveniently manipulated to effectively hold the reel upon its seat or to permit the reel to be removed when desired. The sides 17 of the yoke are provided with slots 22, one edge of which is formed with spaced notches 23 to accommodate the pivot 18. This construction permits the yoke to be adjusted so that it will clamp any size reel.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. The combination with a fishing pole having a reel seat, and a reel including a base adapted to repose upon the seat, of a yoke-like member pivoted upon the pole and having an end portion designed to straddle a portion of the base to hold the reel on its seat, and cooperating means on the pole and the adjacent end of the yoke for holding the latter fixed relatively to the pole when in use.

2. The combination with a fishing pole having a reel seat, and a reel including a base adapted to repose upon the seat, of a yoke pivoted on the pole and including a curved end portion adapted to straddle a portion of the base to hold the reel upon its seat, said pole having spaced depressions, projections carried by one end of the yoke and adapted to snap in said depressions, to hold the yoke fixed with relation to the pole when in position for use, and a curved member connecting the free ends of said yoke.

3. The combination with a fishing pole having a reel seat and a reel including a base adapted to repose upon said seat, of a yoke like member pivoted upon the pole and adapted to straddle a portion of said base to effectively hold the reel upon its seat, said yoke having parallel slots receiving said pivot, whereby said yoke can be adjusted to accommodate reels of different sizes, and one wall of each slot having spaced notches to accommodate the pivot as described.

In testimony whereof I affix my signature.

JOSEPH C. HOOPER.